United States Patent [19]

Humphreys, Jr.

[11] 3,893,02!

[45] July 1, 197!

[54] APPARATUS FOR DETERMINING THE DISTANCE TO A CONCEALED CONDUCTIVE STRUCTURE

[75] Inventor: Thomas G. Humphreys, Jr., Birmingham, Ala.

[73] Assignee: George G. Plosser, Birmingham, Ala.

[22] Filed: Feb. 1, 1974

[21] Appl. No.: 438,939

[52] U.S. Cl. ............................. 324/67; 324/3
[51] Int. Cl. .................. G01r 19/16; G01v 3/08
[58] Field of Search ......................... 324/1, 3–8, 324/67

[56] References Cited
UNITED STATES PATENTS

| | | | |
|---|---|---|---|
| 1,897,688 | 2/1933 | Ambronn | 324/1 |
| 2,358,027 | 9/1944 | Penther et al. | 324/8 X |
| 2,428,326 | 9/1947 | Fay | 324/67 |
| 2,471,105 | 5/1949 | Gustafsson et al. | 324/ |
| 3,562,633 | 2/1971 | Swain | 324/3 ) |
| 3,617,865 | 11/1971 | Hakata | 324/ |
| 3,704,413 | 11/1972 | Blevins | 324/6 |

FOREIGN PATENTS OR APPLICATIONS 1,056,768   1/1967   United Kingdom............... 324/6'

OTHER PUBLICATIONS

Young C. A., Measuring the Depth of Buried Cable Bell Laboratories Record, Nov. 1965, pp. 399–401.

Primary Examiner—Gerard R. Strecker

[57] ABSTRACT

A device for locating concealed conductive structures in both horizontal and vertical planes wherein depth measurements are accomplished by a comparison of the signal outputs from two vertically spaced antennas which are energized by a signal radiated from a buried or otherwise concealed object.

10 Claims, 4 Drawing Figures

FIG. 2

PATENTED JUL 1 1975 3,893,025

APPARATUS FOR DETERMINING THE DISTANCE TO A CONCEALED CONDUCTIVE STRUCTURE

BACKGROUND OF THE INVENTION

1. Field of the Invention

This invention relates to devices for detecting buried or concealed pipes, cables, and similar structures and more particularly to such an apparatus which utilizes an electromagnetic signal radiated by the structure to be located.

2. General Description of the Prior Art

A number of electronic devices now exist and are commonly used to determine the location, in the horizontal plane, of buried or otherwise concealed electrically conductive structures. Some of the devices utilize a balanced inductive bridge to detect such structures by observing an unbalanced condition created by the presence of a conductive structure in the field of the transmitting and receiving coils or loops. Others use an alternating current which is impressed on the structure, such as a pipe, wire or cable, by direct connection or inductive coupling. The structure can then be located, in the horizontal plane or laterally, by use of a suitable pickup coil and amplifier with an appropriate indicating device such as a meter or audio transponder. As the receiver antenna or pickup coil is brought closer to the structure being located, the signal level increases and the position nearest to the structure produces the strongest signal. Either a signal peak or null can be employed by orienting the coil either parallel to, or at right angles to, the structure.

Some of the devices are also used to determine the depth of the structure by triangulation wherein the coil is shifted to a 45° position (or other angle) and finding either the null or peak signal off to one side of the structure. It is then possible to establish the geometric relationship of the two points with respect to the structure and thereby determine its depth from the surface. This procedure is difficult and is often unsatisfactory because of the existence of other nearby structures and variations in topography.

An improved device, described in the November 1965 issue of the Bell Laboratories Record, employs two signal receptors or antennas offset vertically which sense a signal being radiated by an object. The ratio of the amplitudes of these signals from the two antennas is used to determine the depth of the object. This is accomplished in two steps. First, an amplified signal from the lower of the two antennas is sensed, and by means of a signal level adjustment, a meter is adjusted to full scale responsive to this signal. Thereafter, the lower antenna is disconnected and an amplified signal from the upper antenna is fed to the same meter. The resulting scale deflection is then representative of the ratio of the signals and indicates the depth of the object since the meter is calibrated for this purpose. While this device is capable of providing good results, it is somewhat complex to operate, and inaccuracies can occur due to signal field changes or amplifier drift occurring during the two stages of measurement.

Accordingly, it is the object of this invention to provide a new and improved locator of the character described which overcomes the aforesaid and other difficulties and enables an operator to accurately and rapidly locate an object, both laterally and vertically with little effort or experience.

SUMMARY OF THE INVENTION

The present invention utilizes two antennas separated in the vertical plane and depth measurement involves the determination of the ratio of two signals as aforesaid; however, an improved system of signal processing is employed. Thus, in accordance with the present invention, the signal outputs from the antennas are connected together in an electrically subtractive mode through an adjustable signal attenuator. The depth of an object is then directly read from a calibrated scale associated with the attenuator, a correct depth being indicated when the attenuator is adjusted for minimum signal output.

DETAILED DESCRIPTION OF THE DRAWINGS

Figure 1:
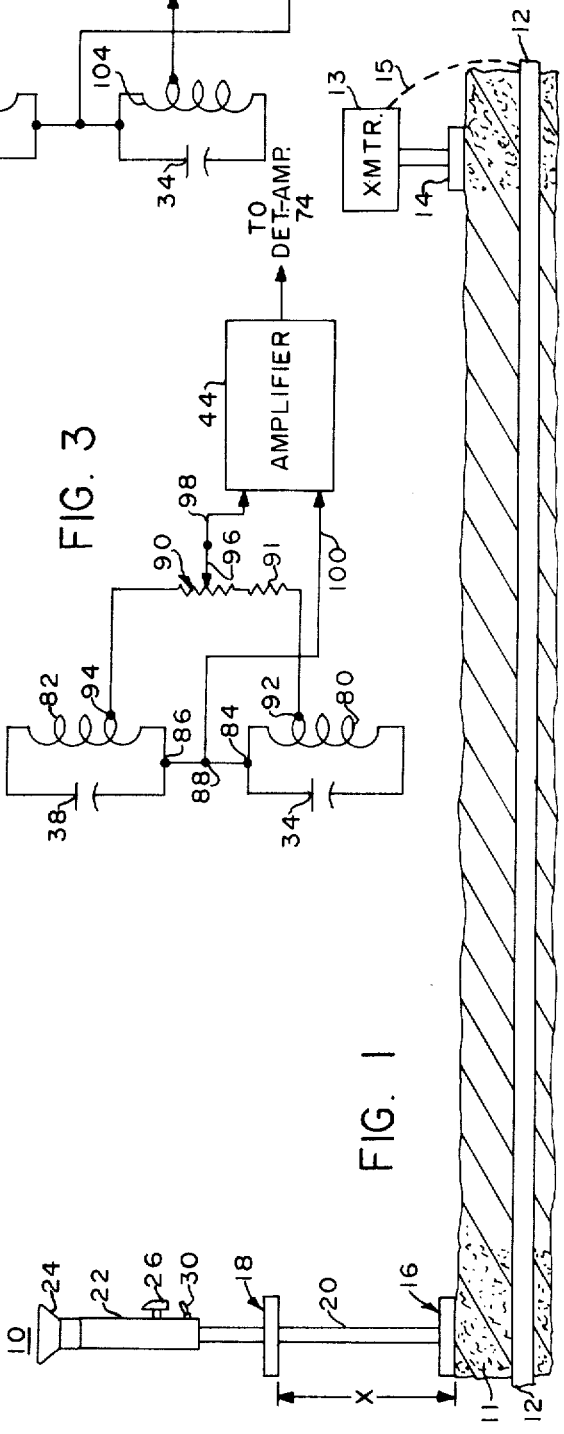
FIG. 1 is a diagrammatic illustration of the arrangement of components of the invention and an example of its usage.

FIG. 1 illustrates the general configuration of a conductive object locator as contemplated by this invention together with an example of its usage. As shown, locator 10 of this invention is positioned on the surface of earth 11 above a buried cable 12 upon which a radio signal has been impressed. As shown, this signal is provided by transmitter 13 to cable 12. This may be accomplished by coupling provided by antenna 14 held near cable 12 or as shown in dashed line 15, by direct electrical connections to cable 12. Typically, an unmodulated signal frequency 1 $KH_z$ to 500 $KH_z$ is employed.

Figure 2:
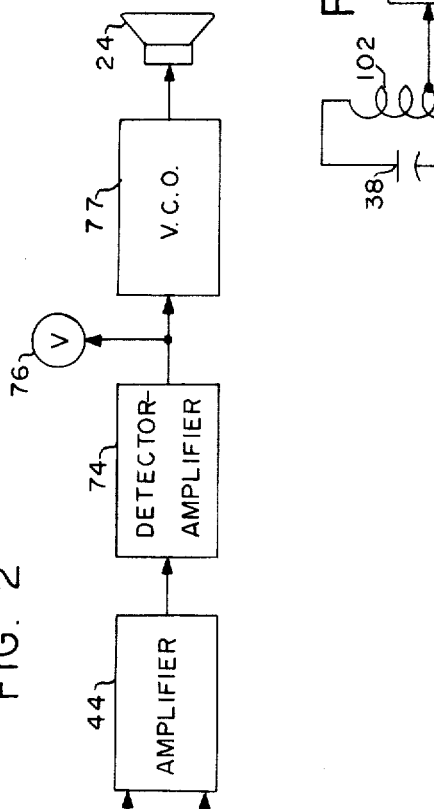
FIG. 2 is an electrical schematic diagram of an embodiment of the invention.

Locator 10 includes a lower antenna 16 and an identical upper antenna 18, spaced a selected distance apart and mounted on vertical support 20. Electronic circuitry, schematically illustrated in FIG. 2, is contained in cabinet 22 which is also mounted on support 20. A speaker 24 is shown extending from cabinet 22 and it provides an audible indication of signal received by the locator. An adjustment knob-pointer 26, which controls potentiometer 28 (FIG. 2), and search-depth selector 30 extend from cabinet 22 and are the only controls necessary to operate the locator.

Referring now to the circuitry of the system shown in FIG. 2, lower antenna 16 consists of an electrical pickup or antenna coil 32 and parallel connected capacitor 34, the two being tuned to the frequency of the location signal radiated from, in this case, buried cable 12. Identical upper antenna 18 consists of parallel connected pickup or antenna coil 36 and capacitor 38. Terminals 40 and 42 of coils 36 and 32, respectively, represent, as wound, opposite signal polarity points, and are connected together at terminal 43 and to one input of amplifier 44 which is tuned for maximum effectiveness at the frequency of the location signal. Connections are made to coils 36 and 32 at equal amplitude voltage taps 46 and 48, respectively, providing at these taps, output voltages which are equal in amplitude but opposite in polarity, assuming that equal voltages are induced into each of the coils. Lead 50 is connected between tap 46 and terminal 52 of double pole, double switch 30 and lead 54 connects tap 48 to movable contact 56 of switch 30. Contacts 58 and 60 of switch 30 are connected together. The extreme terminals 61 and 62 of potentiometer 28 are connected, respectively, between common antenna terminal 43 and contact 52 of switch 30. Movable contact 64 of potentiometer 28 is electrically connected to terminal 66 of switch 30 and mechanically coupled to pointer 26 of depth readout 70, as illustrated by dashed line 72. Depth readout 70 includes a scale 71 calibrated, for example, in feet.

Tuned amplifier 44 amplifies the signal applied to it and provides an input to detector-amplifier 74. Detector-amplifier 74 detects the input, amplifies it, and the resulting signal is fed to either or both meter 76 and voltage controlled oscillator (V.C.O.) 77. Voltage controlled oscillator 77, a particular form of which is disclosed in applicant's U.S. Pat. No. 3,418,572, is employed to drive speaker 24 at a frequency indicative of the intensity of a detected signal to facilitate adjustment of potentiometer 28 to a minimum signal level condition.

To examine operation of the system, assume that initially switch 30 is positioned as shown, which is in a "search" mode as would be employed where it is necessary to first determine the lateral position of an object being sought, in this case, cable 12. In this mode of operation, the output of lower antenna 16 is connected to the input of amplifier 44. Thus, there is no differential effect between the antennas, and locator 10 is simply moved across what would be understood to be the area in which cable 12 is located until a maximum level signal is registered by meter 76 or speaker 24. At this point, locator 10 will be positioned immediately above cable 12.

To determine the depth of cable 12, switch 30 is moved to the opposite or "depth" mode, and in this position the output of upper coil 36 (between common terminal 43 and tap 46) is connected in parallel between common terminal 43 and that portion of lower coil 32 represented by the setting of potentiometer 28. Thus, a selected portion of the voltage across lower antenna 16 is coupled, out of phase, or in a subtractive mode, to the voltage across a like portion of upper antenna 18. By employing potentiometer 28, a potentiometer in which the resistance element varies in resistance along its length as a function of the square of the distance of the element, a linear scale 71 for depth readout 70 is achieved. This follows in view of the fact that the signal intensity radiated from cable 12 upward to antennas 16 and 18 decreases as the square of the distance from the cable to an antenna. By thus adjusting potentiometer 28 while observing the signal output of the locator, either visually from meter 76 or audibly by noting the tone from speaker 24, a precise distance or depth of cable 12 is indicated when a zero or a minimum signal is observed.

As an example of calibration of depth readout 70, reference is made to the following chart in which X is representative of the distance between antennas:

| Depth | | Lower/Upper Antenna Signal Ratio | | |
|---|---|---|---|---|
| 1X | = | .250 | 10X | = | .826 |
| 2X | = | .444 | 11X | = | .840 |

-Continued

| Depth | | Lower/Upper Antenna Signal Ratio | | |
|---|---|---|---|---|
| 3X | = | .562 | 12X | = | .852 |
| 4X | = | .640 | 13X | = | .862 |
| 5X | = | .694 | 14X | = | .871 |
| 6X | = | .734 | 15X | = | .878 |
| 7X | = | .766 | | | |
| 8X | = | .790 | | | |
| 9X | = | .810 | 20X | = | .907 |

By making X equal to one foot, an accurate range of one to ten feet is obtained from depth readout 70. X can, of course, be made selectively larger and the measurement range be extended. Similarly, a smaller scale may be employed by locating the antennas closer together. In general, X should be equal to at least 0.05 times the greatest distance which is to be measured.

Figure 3:
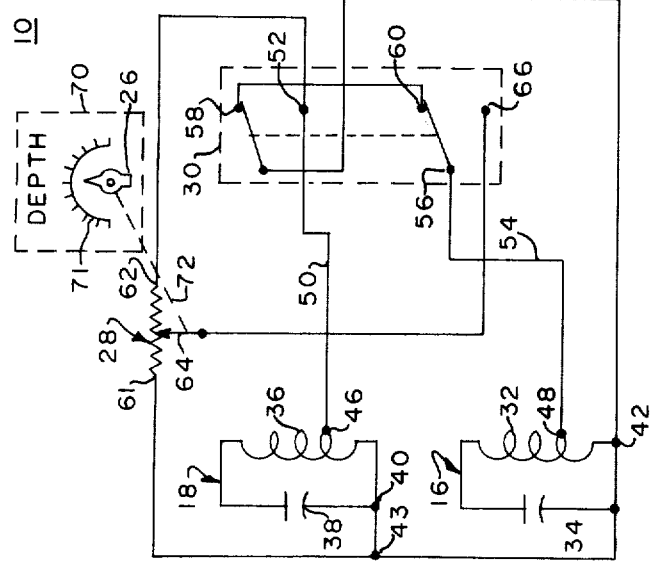
FIG. 3 is an electrical schematic diagram of an alternate embodiment of the invention.

An alternate arrangement for subtracting outputs of antenna coils is illustrated in FIG. 3. In this arrangement, unlike polarity points 84 and 86 of antenna coils 80 and 82 are connected together at a common terminal 88 and potentiometer 90 is connected in series with resistor 91 across like amplitude but unlike polarity terminals 92 and 94. Resistor 91 has a like value to that of the total resistance of potentiometer 90. This arrangement provides an electrical bridge in which for conditions of equal voltage across antenna coils 80 and 82 and movable contact 96 contacting the lower end of potentiometer 90, the output voltage between leads 98 and 100 would be zero. This, of course, corresponds to a condition of essentially infinite distance or depth of measurement. Thus, progressively greater depths are indicated by zero outputs occurring at progressively lower positions on potentiometer 90. While the measurement scale will be shifted thereby, resistor 91 may be omitted. When resistor 91 is included, search operations would normally be conducted with the upper antenna coil 82. By shorting out resistor 91 and moving movable arm 96 to its lowest position, searches may be effectively conducted with lower antenna coil 80 as is the case with search measurement made by the embodiment shown in FIG. 2. Potentiometer 90 would, of course, be connected, as is potentiometer 28, to an appropriate depth scale.

The output of the antenna coil-potentiometer (FIG. 3) between movable contact 96 and common antenna coil terminal 88 is applied to tuned amplifier 44 and the signal processed as described above for the circuit of FIG. 2.

Figure 4:
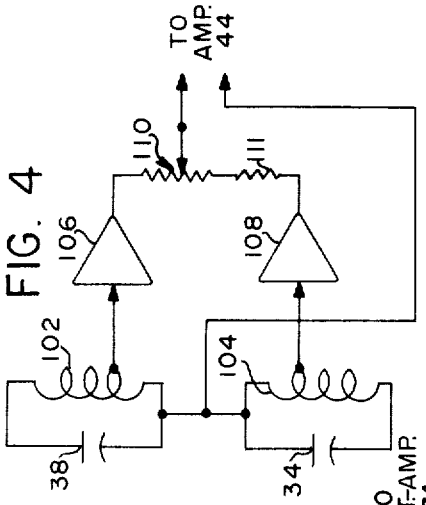
FIG. 4 is a partial electrical schematic diagram of a modification of the embodiments shown in FIGS. 2 and 3.

FIG. 4 illustrates a circuit modification applicable to either of the circuit configurations shown. In this modification, the antenna outputs from coils 102 and 104 are separately amplified by amplifiers 106 and 108 before being compared or balanced by potentiometer 110 in series with resistor 111, and fed to tuned amplifier 44. This enables, in certain instances of low signal conditions, a greater sensitivity for the system.

As stated above, typically, the present invention would be employed in conjunction with an unmodulated radio frequency signal. This is desirable because the operation of this system involves phase cancellation between the signal outputs of the two antennas which is facilitated by the employment of a constant frequency and phase signal. The system may, however, be employed with a tone.

What is claimed is:

1. A locator for determining the distance to a concealed conductive object lying along a known direction and wherein the object is radiating an alternating current signal, said locator comprising:
   first and second signal receptors, each being adapted to receive said signal and provide an output voltage in proportion to the level of said signal as received;
   support means for positioning said receptors a selected and fixed distance apart whereby one receptor may be positioned a selected distance greater than the other from said object;
   signal combining means, including adjustment means, coupled to the outputs of said receptors for adjustably combining said outputs in a subtractive mode and providing a combined signal output which is reducible to a substantially zero level as a function of setting of said adjustment means;
   detection means responsive to the output of said signal combining means for indicating when said combined signal output is at a substantially zero level; and
   depth indication means coupled to said signal combining means and responsive to adjustment of said adjustment means and the distance apart of said receptor for indicating the distance to a concealed conductive object.

2. A locator as set forth in claim 1 wherein said signal combining means comprises a potentiometer.

3. A locator as set forth in claim 1 further comprising an amplifier coupling the output of each receptor to said signal combining means.

4. A locator as set forth in claim 2 wherein the output of one of said receptors is connected across the full range of said potentiometer and the output of the other said receptor is connected across an adjustable portion of the range of said potentiometer.

5. A locator as set forth in claim 2 wherein the outputs of said receptors are connected in series across the full impedance of said potentiometer and the output of said signal combining means is coupled from the adjustable arm of said potentiometer and a common receptor connection to said detection means.

6. A locator as set forth in claim 2 wherein said potentiometer is adjustable to provide a resistance which varies as the square of the distance of adjustment of said potentiometer, whereby said depth indication means comprises a linear scale.

7. A locator as set forth in claim 2 wherein said detection means comprises means for providing a variable frequency output as a function of the detected signal level.

8. A locator as set forth in claim 2 wherein said detection means includes means for providing an audible signal output indicative of the output of said signal level adjustment means.

9. A locator as set forth in claim 1 further comprising selection means coupled to at least one of said signal receptors for coupling it directly to said detection means whereby in this mode of connection said locator is adapted to determine the direction along which said object extends.

10. A locator as set forth in claim 2 wherein each said signal receptor comprises an electrical capacitor connected in parallel whereby said receptor is tuned to a preselected frequency.

* * * * *